United States Patent

[11] 3,623,751

| [72] | Inventor | Clarence E. Hulbert, Jr.<br>1810 Columbia, West Columbia, Tex. 77486 |
|---|---|---|
| [21] | Appl. No. | 863,725 |
| [22] | Filed | Apr. 4, 1969 |
| [45] | Patented | Nov. 30, 1971 |

[54] SWIVEL JOINT
1 Claim, 2 Drawing Figs.

[52] U.S. Cl. .................................................. 285/55,
285/281, 285/331
[51] Int. Cl. .................................................. F16l 27/00
[50] Field of Search .......................................... 285/55,
281, 331

[56] References Cited
UNITED STATES PATENTS

| 2,507,849 | 5/1950 | Bland | 285/281 |
| 2,509,090 | 5/1950 | Faccou | 285/281 |
| 3,211,471 | 10/1965 | Darlington | 285/281 X |
| 3,284,106 | 11/1966 | McIntosh et al. | 285/281 X |
| 3,411,811 | 11/1968 | Holland | 285/281 X |

*Primary Examiner*—Thomas F. Callaghan
*Attorneys*—Ned L. Conley, Murray Robinson, Robert W. B. Dickerson and Bill B. Berryhill ABSTRACT: A swivel joint particularly useful in a conduit for conveying abrasive materials, the joint comprising a housing having a pair of longitudinally spaced-apart radial thrust bearings mounted therein, the housing being rotatable with a coupling on one end and rotatable with respect to another coupling on the other end, the coupling on the other end having affixed thereto a mandrel on which the bearings are mounted, the whole being lined with a resilient abrasive-resistant material.

CLARENCE E. HULBERT, JR.
INVENTOR.

3,623,751

SWIVEL JOINT

BACKGROUND OF THE INVENTION

1. Field of the Invention

This invention relates to swivel joints, particularly of the type suitable for use in conveying abrasive dry solids suspended in air or other gaseous fluid, as in the case where sand is conveyed for sandblasting operations.

2. Description of the Prior Art

In sandblasting operations it has been the practice to convey sand with air through flexible rubber lined hose. The subjection of such a hose to high pressure causes expansion of the hose which results in twisting and kinking the hose. In normal use, where the sandblasting nozzle is handled manually, the hose is readily untwisted. However, in mechanized sandblasting operations, as for example, of the type disclosed in my copending application Ser. No. 740,002, filed Apr. 4, 1968 and now abandoned the ends of the hose are fixed so that it cannot be readily untwisted. It is therefore necessary to provide a swivel joint in the hose to allow such twisting.

A large variety of swivel joints have heretofore been provided for various applications. Examples of such swivel joints are shown in the following U.S. Pat. Nos.: 2,312,341 to King; 2,434,684 to Casperson 2,518,443 to Bagnard; 2,533,421 to Bodnar; 3,011,803 to Buckner et al. 3,156,476 to Roessler, Jr.; 3,290,068 to Jackson.

None of the swivel joints heretofore provided are suitable, however, for handling of abrasive dry solids suspended in air at high velocities. None of such swivel joints provide means for preventing the abrasive from wearing away the material of the swivel joint and for preventing leakage in the presence of abrasive materials under high pressure.

SUMMARY OF THE INVENTION

According to the present invention bearing means are utilized to provide two relatively rotatable elements each of which can be attached to a hose section, and such elements are lined with tubular abrasive-resistant resilient means and are provided with seal means to protect the bearing means and other elements from abrasives.

DESCRIPTION OF THE PREFERRED EMBODIMENTS

Figure 1:
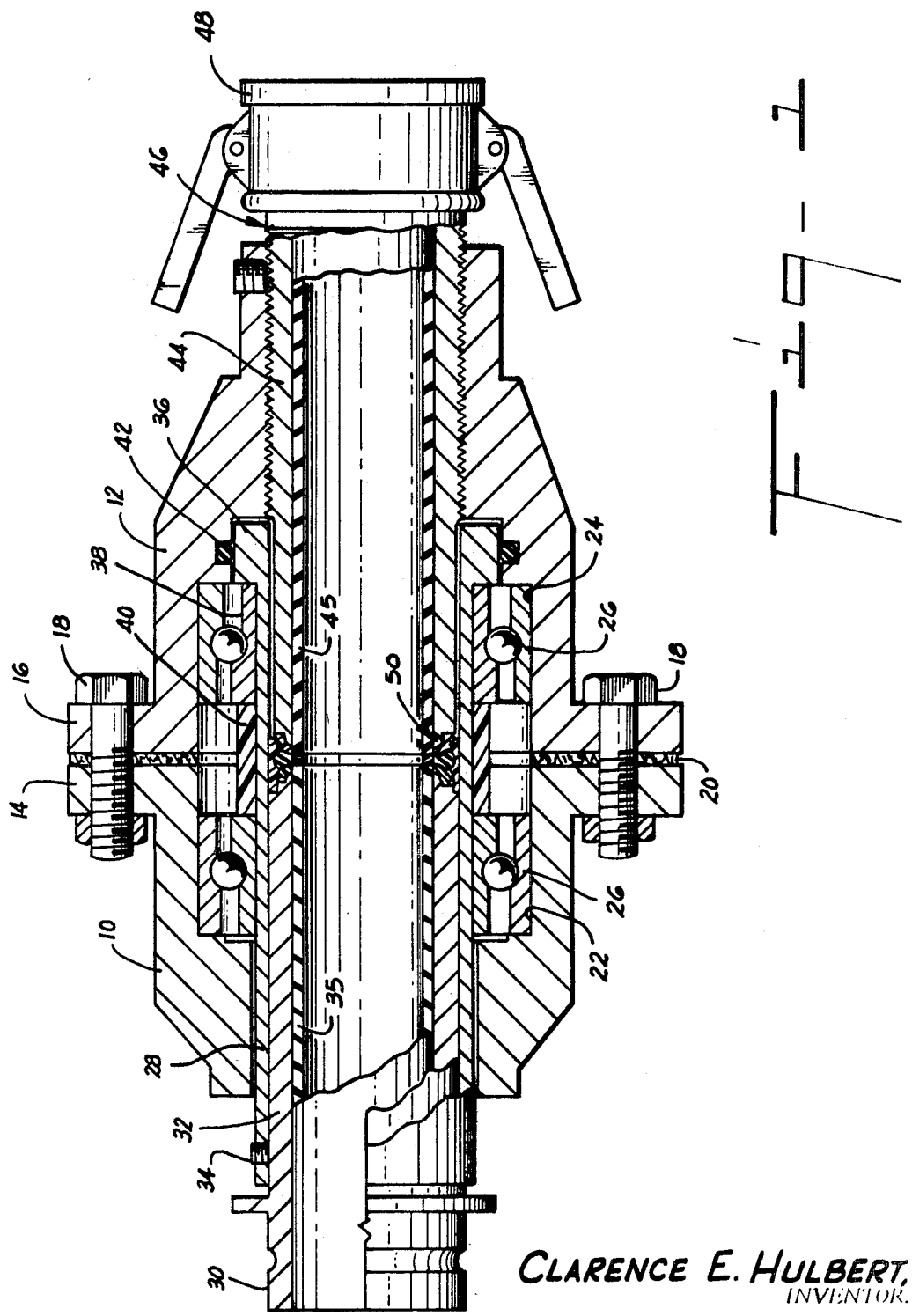
FIG. 1 is a longitudinal sectional view of a preferred embodiment of the invention.

FIG. 1 of the drawing shows a housing comprising two halves 10 and 12 having flanges 14 and 16, respectively, which are joined together by cap screws 18. A gasket 20 is held between the faces of the flanges. As shown, the housing halves are provided with counterbores 22 and 24, each of which is adapted to receive a radial thrust bearing 26. The radial thrust bearings are mounted upon a mandrel 28 which is a part of one hose coupling, which comprises a male coupling portion 30 of conventional design and a stem portion 32 which is telescopically received within the mandrel portion 28 and fits closely therein. The stem portion is locked to the mandrel portion by means of a set screw 34. The hose coupling is lined with an abrasion resistant, resilient liner 35, which may be a piece of hose held in the coupling by conventional means, such as screws (not shown).

As shown, the right-hand end of the mandrel 28 is provided with circumferential flange member 36 which provides a shoulder 38 which bears against the inner race of the right-hand bearing 26. The opposite side of this inner race engages a cylindrical ring member 40 which is held between the inner races of the bearings.

An O-ring 42 is fitted within a groove in the housing half 12 and sealingly engages the flange 36. Similar seal means may be provided between the housing half 10 and the mandrel portion 28, or the narrow gap shown may be relied upon to prevent leakage of lubricant from the bearing cavity or admittance of foreign material into the bearing cavity.

The right-hand housing half 12 is, as shown, threadedly engaged to a stem portion 44 of a right-hand hose coupling 46 which comprises a female coupling half 48 of known construction. The stem 44 is telescopically received within the mandrel portion 28 and is rotatable relative thereto. Stem 44 is also provided with a liner 45 similar to liner 35.

Figure 2:
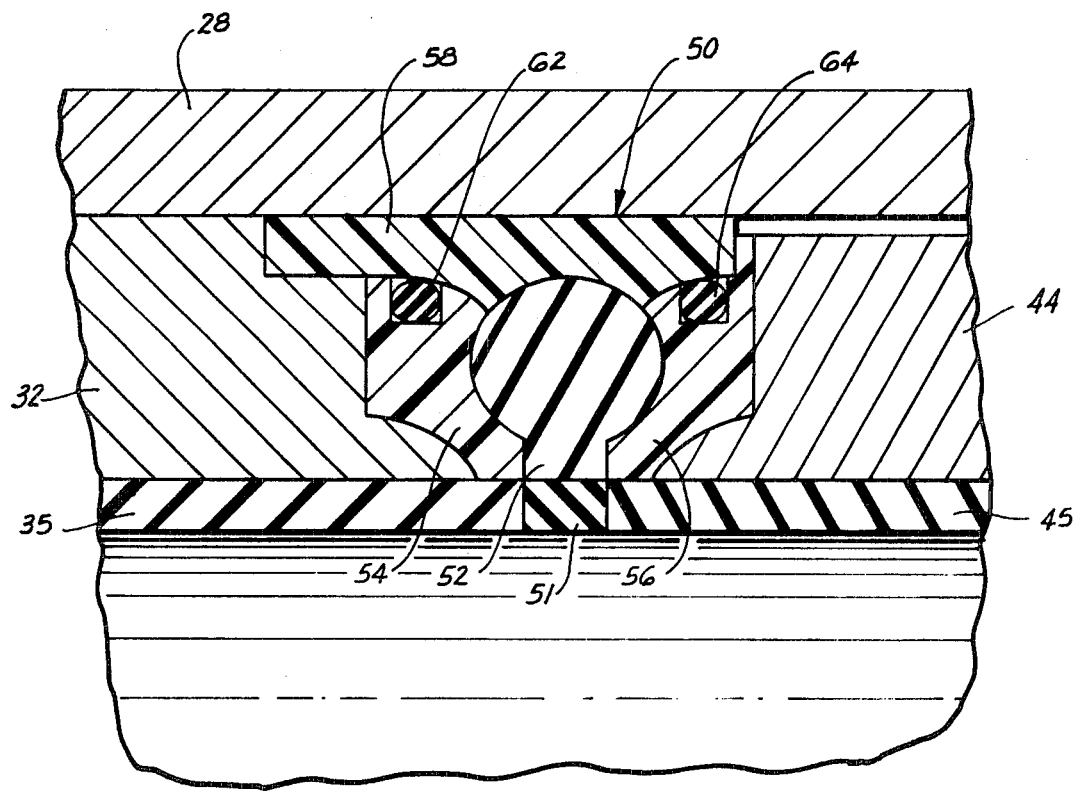
FIG. 2 is a fragmentary enlarged view showing a preferred form of seal for use in the swivel joint of this invention.

Reference is now made to FIG. 2 of the drawing for a preferred embodiment of a sealing device 50 which is sealingly engaged by the adjacent ends of the stem portions 32 and 44 of the relatively rotatable coupling members.

Intermediate the ends of the liners 35 and 45 there is positioned a resilient abrasive resistant annular ring 51, and this ring is surrounded by an O-ring 52. The O-ring is retained intermediate two annular rings 54 and 56 and a surrounding ring 58, the three rings 54, 56 and 58 being configured on their faces engaging the O-ring 52 so as to confine the O-ring and prevent its distorting out of shape in any direction except radially inwardly. Thus, when the stems 32 and 44 tend to move toward each other the compression on the O-ring will force it to distort radially inwardly. The members 54, 56 and 58 are desirably made of a self-lubricating material such as polytetrafluroethylene. O-ring 60 and 62 are provided intermediate rings 54 and 56 and ring 58 to prevent leadage therebetween.

Although a preferred embodiment of the invention has been shown and described herein, the invention is not limited to such preferred embodiment but only as defined by the following claims:

1. A sealed swivel joint for connection in a hose for conveying abrasive fluids comprising
   a housing with a longitudinal opening therethrough,
   a first hose coupling means affixed to said housing for rotation therewith,
   a second hose coupling means having a mandrel thereon rotatably received within said housing,
   a stem on said first hose coupling means concentrically positioned within and rotatable with respect to said mandrel,
   a shoulder on the end of said stem within the mandrel,
   an outside shoulder on the end of said mandrel which receives the stem,
   an inside shoulder on said mandrel adjacent the shoulder on the stem,
   a first radial thrust bearing mounted on said mandrel and within said housing against said outside shoulder, positioned around said stem,
   a second radial thrust bearing mounted on said mandrel and within said housing, longitudinally removed from said first bearing and said stem so as to be around only said mandrel,
   separate tubular resilient means lining each of said mandrel and said stem, and extending to said adjacent shoulders, and
   seal means engaging the adjacent ends of said tubular linings and sealing between the inside of the tubular linings and the bearings,
   the distance between the outside shoulder and the inside shoulder on the mandrel being adjustable to adjust the compression of the seal.

* * * * *